(12) United States Patent
Bates et al.

(10) Patent No.: US 9,483,230 B1
(45) Date of Patent: Nov. 1, 2016

(54) WEARABLE DEVICE ZONE GROUP CONTROL

(71) Applicant: Sonos, Inc, Santa Barbara, CA (US)

(72) Inventors: Paul Andrew Bates, Santa Barbara, CA (US); Danielle Storlie, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 2 days.

(21) Appl. No.: 14/682,547

(22) Filed: Apr. 9, 2015

(51) Int. Cl.
*G06F 17/00* (2006.01)
*G06F 3/16* (2006.01)

(52) U.S. Cl.
CPC .................................... *G06F 3/165* (2013.01)

(58) Field of Classification Search
CPC ................ H04R 2420/07; H04R 2227/005; H04N 21/8113; G06F 3/16; G06F 3/165; G06F 3/167
See application file for complete search history.

(56) References Cited

U.S. PATENT DOCUMENTS

| | | | |
|---|---|---|---|
| 5,923,902 A | 7/1999 | Inagaki | |
| 6,256,554 B1 | 7/2001 | DiLorenzo | |
| 6,404,811 B1 | 6/2002 | Cvetko et al. | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,483,538 B2 | 1/2009 | McCarty et al. | |
| 7,571,014 B1 | 8/2009 | Lambourne et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington et al. | |
| 8,423,893 B2 | 4/2013 | Ramsay et al. | |
| 8,762,565 B2 | 6/2014 | Togashi et al. | |
| 8,965,544 B2 | 2/2015 | Ramsay | |
| 2001/0042107 A1 | 11/2001 | Palm | |

(Continued)

FOREIGN PATENT DOCUMENTS

WO 0153994 A2 7/2001

OTHER PUBLICATIONS

"AudioTron Quick Start Guide, Version 1.0", Voyetra Turtle Beach, Inc., Mar. 2001, 24 pages.

(Continued)

*Primary Examiner* — Andrew C Flanders

(57) ABSTRACT

Examples disclosed and described herein facilitate zone grouping and adjustment of zone representation dependent upon a zone's grouping status. An example method includes affecting, via a computing device, display and control of a user interface configured for a display of a wearable device, the user interface arranged to display at least a first item and a second item. The first item is displayed using a first graphical characteristic, and the second item is displayed using a second graphical characteristic. Each item corresponds to a zone and selectable to cause the corresponding zone to be added to a zone group. The example method includes triggering, via the computing device based on a selection, a joining of a second zone with a selected first zone group including a first zone represented by the first item.

20 Claims, 13 Drawing Sheets

(56) References Cited

U.S. PATENT DOCUMENTS

| | | |
|---|---|---|
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2007/0142944 A1 | 6/2007 | Goldberg et al. |
| 2016/0062567 A1 | 3/2016 | Yang et al. |

OTHER PUBLICATIONS

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

"Bluetooth. "Specification of the Bluetooth System: The ad hoc SCATTERNET for affordable and highly functional wireless connectivity" Core, Version 1.0 A, Jul. 26, 1999, 1068 pages".

"Bluetooth. "Specification of the Bluetooth System: Wireless connections made easy" Core, Version 1.0 B, Dec. 1, 1999, 1076 pages".

"Dell, Inc. "Dell Digital Audio Receiver: Reference Guide" Jun. 2000, 70 pages".

"Dell, Inc. "Start Here" Jun. 2000, 2 pages".

"Jo, J. et al., "Synchronized One-to-many Media Streaming with Adaptive Playout Control," Proceedings of SPIE, 2002, pp. 71-82, vol. 4861".

Jones, Stephen, "Dell Digital Audio Receiver: Digital upgrade for your analog stereo" Analog Stereo Jun. 24, 2000 retrieved Jun. 18, 2014, 2 pages.

Louderback, Jim, "Affordable Audio Receiver Furnishes Homes With MP3" TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

"UPnP; "Universal Plug and Play Device Architecture"; Jun. 8, 2000; version 1.0; Microsoft Corporation; pp. 1-54".

WEARABLE DEVICE ZONE GROUP CONTROL

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc., filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
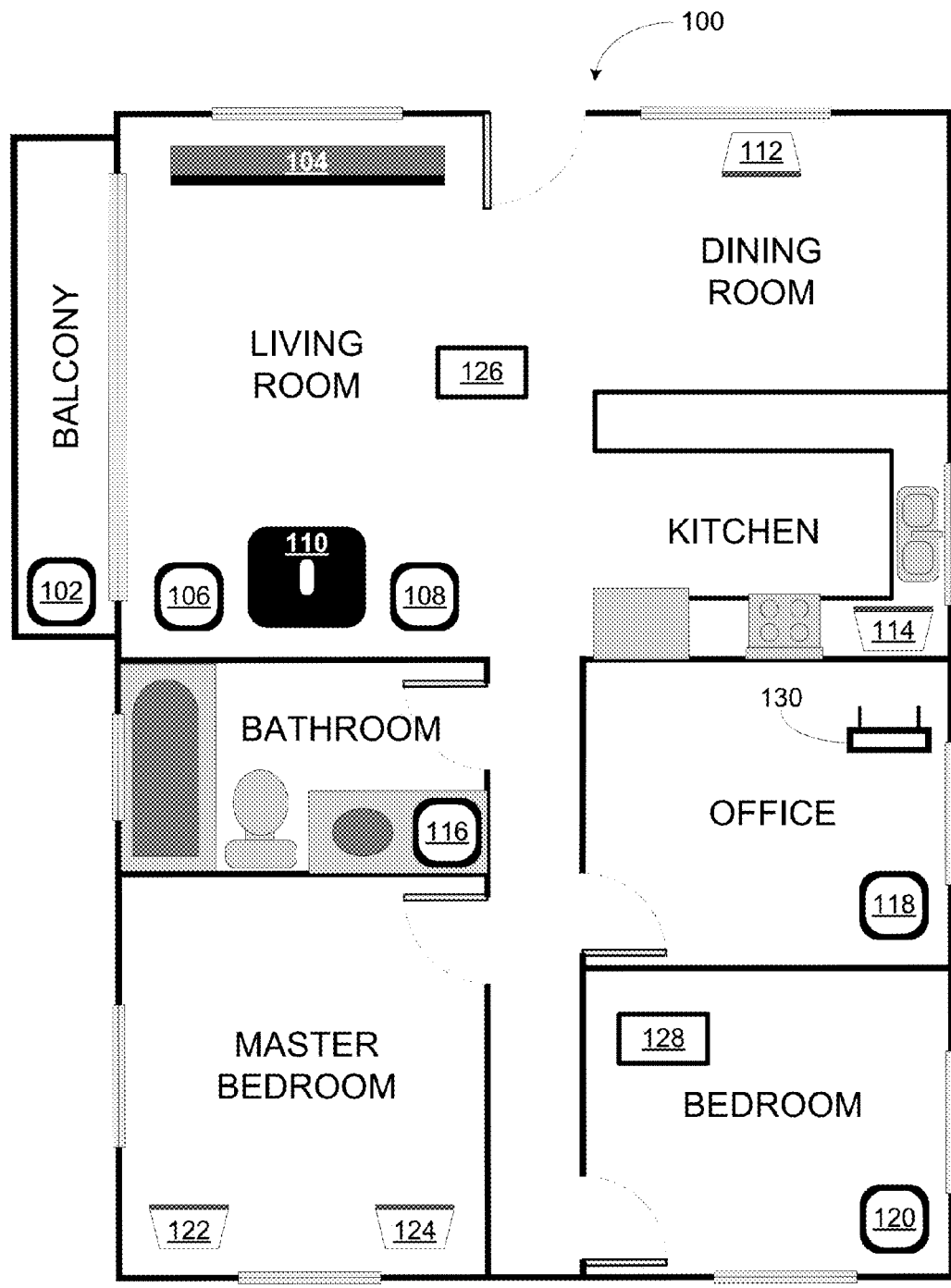
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

As disclosed herein, a wearable device, such as a watch, wristband, bracelet, among other possibilities, can be used with another electronic device to control and/or manage playback of media content via a playback system. For example, a computing device, such as the wearable device or other mobile device, may have installed thereon a controller application to provide a controller interface on the computing device for a media playback system. One or more icons and/or other representations provided via the controller interface can be used to control operation and/or configuration of the media playback system. In some examples, the computing device may communicate with the media playback system via another device, such as a mobile device.

In one example, a first controller application is executing on a mobile device. A second controller application is executing on a wearable device. Controlling playback of media content in a particular playback zone may be performed via the first controller application executing on the mobile device and/or the second controller application executing on the wearable device, alone or in communication together. For instance, control of playback may involve the first controller application receiving from the second controller application, a command provided via the second controller application, and responsively communicate with the media playback device to execute the command. The command may involve one or more of a selection and/or control of playback navigation to view a particular playback zone, playback or stop playback of a media item in one or more playback zones, a change in playback zone configuration, among other possibilities.

Some examples disclosed and described herein involve providing, on a display of a computing device (e.g., a wearable device, a mobile device, other computing device, etc.), playback controls for a particular playback zone of a media playback system, more of which is described below. The playback controls may be used to control playback of media content in the particular playback zone.

In one example, a graphical display of the computing device may display an indication of a playback zone and control elements selectable for controlling media playback in the playback zone of a media playback system. The control elements may include control elements selectable to, among other things, cause media content to be played, paused, skipped forward, and/or skipped backward, etc. The control elements may also include control elements to modify a playback volume in the playback zone, for example. Control elements may also facilitate editing of zones, grouping of zones, etc.

In one case, the playback zone for which the control elements are displayed may be a playback zone that was last accessed using the computing device, a playback zone that the computing device determines is nearest to the computing device, or a predetermined default zone that is displayed when the computing device establishes communication with the media playback system. Other examples are also possible.

In certain examples, a selection of one or more of the control elements may be received via the computing device (e.g., from the wearable device via the mobile device and/or other computing device, etc.). Based on the one or more control elements selected (e.g., received as an input from the wearable device), the computing device communicates with the playback system to cause a particular playback zone of the playback system to go from a first playback state to a second playback state. For instance, if the playback zone is in a paused playback state, a selection of a control element to play media content in the playback zone will cause the playback zone to begin playing media content, or continue playing media content that was previously paused. In some examples, the playback system (e.g., the affected playback zone(s) in the playback system) may return an acknowledgement (e.g., updated configuration information) to the computing device in response to the selection sent by the computing device. Other examples are also possible.

In another aspect, a computing device, such as the mobile device and/or the wearable device, is provided. The computing device includes a processor, and memory having stored thereon instructions executable by the processor to cause the computing device to perform functions. The functions include causing a graphical display to display an indication of a playback zone and at least one control element. The at least one control element controls the playback state of the playback zone. The functions also include receiving by the computing device a selection of one or more of the at least one control element, and, based on the received selection, communicating with a playback system (e.g., one or more playback devices in the playback system) causing the playback zone to enter a second playback state. In some examples, the computing device is or communicates with another computing device (e.g., a smart phone, laptop, personal computer, and/or other controller device) which serves an intermediary to relay instructions, configuration information, etc., and receive acknowledgements, configuration update information, etc., in response from the playback zone.

Some embodiments described herein relate to facilitating zone grouping and adjustment of zone representation in a playback system dependent upon a zone's grouping status. For example, a first computing device (e.g., a wearable device) interacts with a second computing device (e.g., a smart phone, laptop, and/or other controller device) to receive zone configuration information from the playback system, provide zone grouping instructions to the playback system, and receive an updated zone configuration from the playback system. Display of playback system information via an interface of the first and/or second computing device is updated based on the updated zone configuration, for example.

In some embodiments, a computing device includes a communication interface configured to exchange data and commands between the computing device and a wearable device to control a playback system. The example computing device includes a processor configured to receive and process input in conjunction with the communication interface to facilitate control of the playback system. The example processor is configured to affect display and control of a user interface configured for a display of the wearable device. The example user interface forms a control interface to affect a configuration of playback devices in the playback system, and each playback device in the playback system is associated with at least one zone. The example control interface is arranged to display at least a first item and a second item. The first item is displayed using a first graphical characteristic, and the second item is displayed using a second graphical characteristic. Each item corresponds to a zone and is selectable to cause the corresponding zone to be added to a zone group. The example configuration of the playback devices in the playback system includes the zone group. The example processor is configured to trigger, based on a selection of the second item via the user interface, a joining of a second zone corresponding to the second item with a first zone group including a first zone represented by the first item. The example processor is configured to transmit an updated configuration to at least one playback device in the playback system, the updated configuration based on the joining of the second zone to the first zone group.

Some embodiments provide a tangible computer readable storage medium including instruction which, when executed by a computing device, cause the computing device to implement a method. The example method includes affecting, via the computing device, display and control of a user interface configured for a display of a wearable device. The example user interface forms a control interface to affect a configuration of playback devices in a playback system, and each playback device in the playback system associated with at least one zone. The example control interface is arranged to display at least a first item and a second item. The first item is displayed using a first graphical characteristic, and the second item is displayed using a second graphical characteristic. Each item corresponds to a zone and is selectable to cause the corresponding zone to be added to a zone group. The example configuration of the playback devices in the playback system includes the zone group. The example method includes triggering, via the computing device based on a selection of the second item via the user interface, a joining of a second zone corresponding to the second item with a first zone group including a first zone represented by the first item. The example method includes transmitting, via the computing device, an updated configuration to at least one playback device in the playback system, the updated configuration based on the joining of the second zone to the first zone group.

Some embodiments provide an example method which includes affecting, via the computing device, display and control of a user interface configured for a display of a wearable device. The example user interface forms a control interface to affect a configuration of playback devices in a playback system, and each playback device in the playback system associated with at least one zone. The example control interface is arranged to display at least a first item and a second item. The first item is displayed using a first graphical characteristic, and the second item is displayed using a second graphical characteristic. Each item corresponds to a zone and is selectable to cause the corresponding zone to be added to a zone group. The example configuration of the playback devices in the playback system includes the zone group. The example method includes triggering, via the computing device based on a selection of the second item via the user interface, a joining of a second zone corresponding to the second item with a first zone group including a first zone represented by the first item. The example method includes transmitting, via the computing device, an updated configuration to at least one playback device in the playback system, the updated configuration based on the joining of the second zone to the first zone group.

In certain embodiments, a graphical characteristic can include a color, a shading, and/or a pattern, etc.

It will be understood by one of ordinary skill in the art that this disclosure includes numerous other embodiments. While some examples described herein may refer to functions performed by one or more given actors such as "users" and/or other entities, it should be understood that this is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as a commercial setting like a restaurant, mall or airport, a vehicle like a sports utility vehicle (SUV), bus or car, a ship or boat, an airplane, and so on.

a. Example Playback Devices

Figure 2:
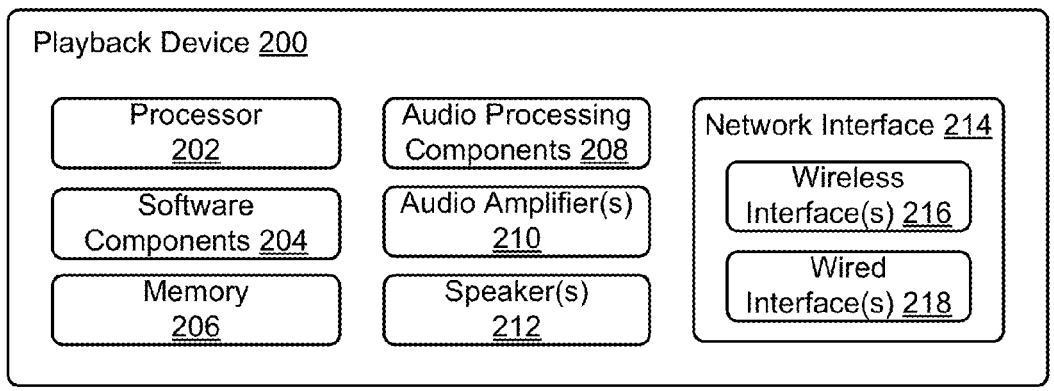
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc., presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones maybe added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
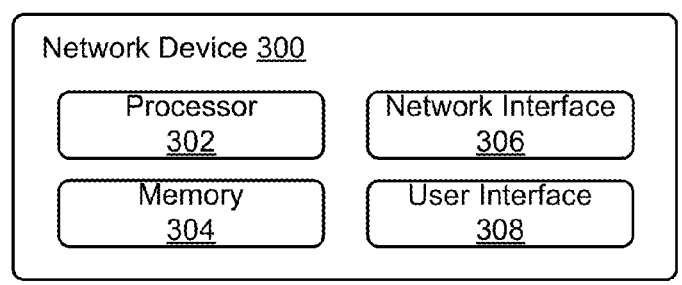
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11 ac, 802.15, 4G mobile communication standard, and so on). The network interface 306 may enable the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
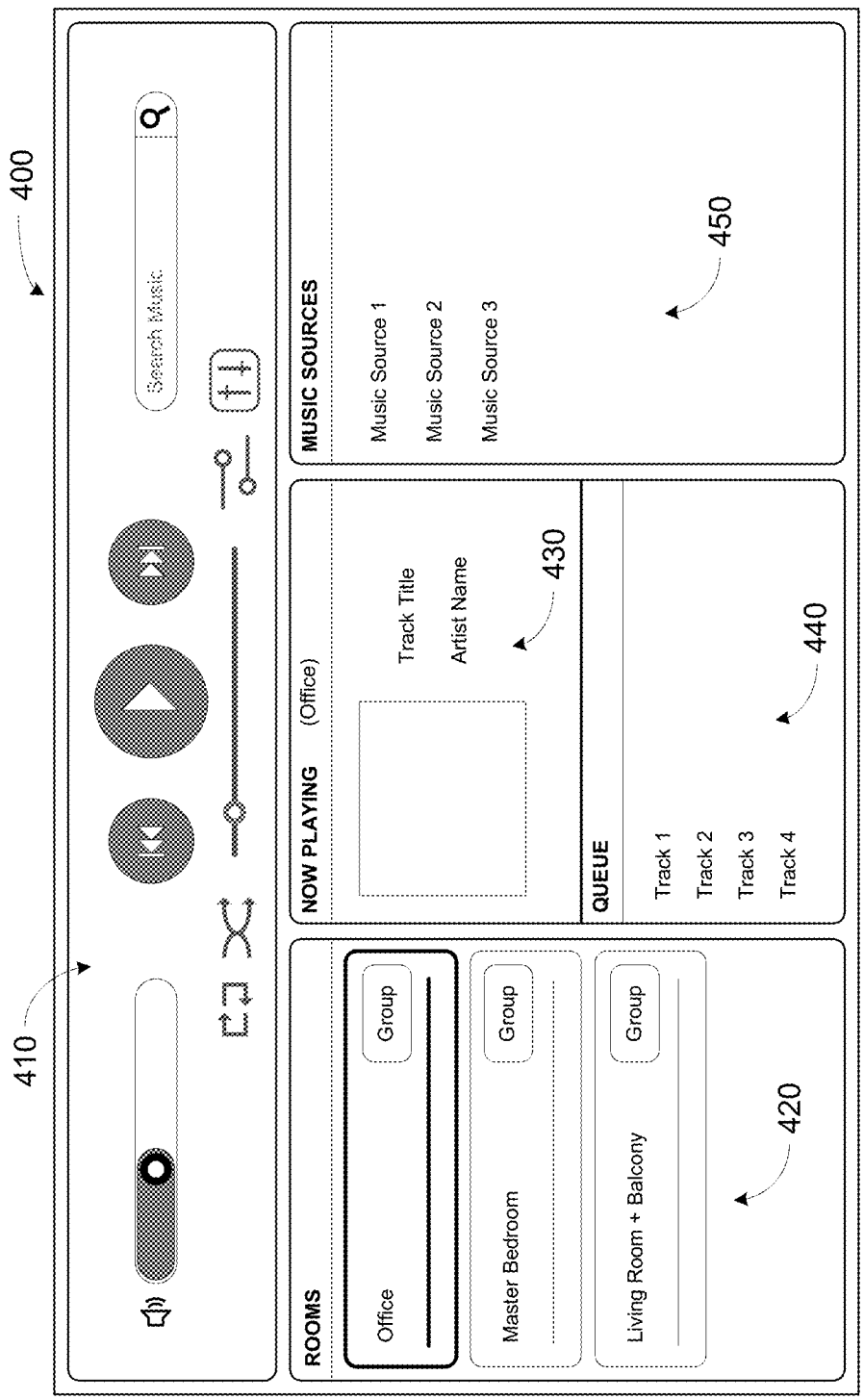
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Playback Device Control Via a Wearable Device

Controller devices and associated controller interfaces help facilitate configuration and/or operation of one or more playback devices in a media playback system. Existing controller interfaces for room grouping, for example, allow users to select rooms and/or zones to perform an action with respect to the selected rooms/zones (e.g., group the zones, save the grouping, cancel the grouping to leave existing group(s) unchanged). However, as a size of a controller interface shrinks (e.g., to execute on a smart watch and/or other wearable device), managing control (e.g., room grouping, etc.) via a limited display area becomes more and more challenging. Certain embodiments disclosed and described herein provide zone (e.g., room and/or other division, etc.) management for a multi-zone system in which a primary and/or secondary controller application has limited available display area. Limited display area ('display area' may also be referred to as screen 'real estate') results in a reduction in information that can be conveyed and a decrease in control options that can be provided through the controller interface.

For example, the limited screen real estate of a wearable device, such as a smart watch, etc., may preclude a controller interface application running on the wearable device from providing a normal or full set of functionality. The controller interface may not have space available to display both 'cancel' and 'back' options, for example, when displaying a grouping screen via the controller interface on the wearable device.

In certain examples, a wearable device such as a smart watch (e.g., an Apple smart watch, Moto smart watch, LG smart watch, Android Wear smart watch, Pebble smart watch, Kairos hybrid watch, etc.) may be configured to run a first controller application which communicates with a second controller application (e.g., a small, faceless application running in the background, a part or extension of a regular controller application running and visible for interaction on the controller device, etc.) on a controller device (e.g., a smart phone, tablet, laptop, desktop computer, etc.). For example, the second controller application can be a separate, standalone controller application, a subordinate controller application for the wearable device, and/or an extension of a regular playback system controller application running on the controller device, etc. The second controller application communicates with a media playback system (e.g., a Sonos™ playback system). In some examples, rather than updating and displaying a graphical user interface associated with the second controller application, updated user interface information is provided via the first controller application on the wearable device (e.g., the smart watch). The second controller application may relay the updated interface information to the first controller application, for example.

Information such as a current room group, connected household, etc., can be maintained, updated, and provided from a playback device to the first controller application (via the second controller application). In some examples, information displayed via an interface associated with the second controller application is also provided via an interface associated with the first controller application. In some examples, a change made on the first controller application results in a corresponding change on the second controller application, and vice versa. For example, changing a room on the second controller application also changes the room information on the first controller application, and vice versa.

Figures 5A, 5B:
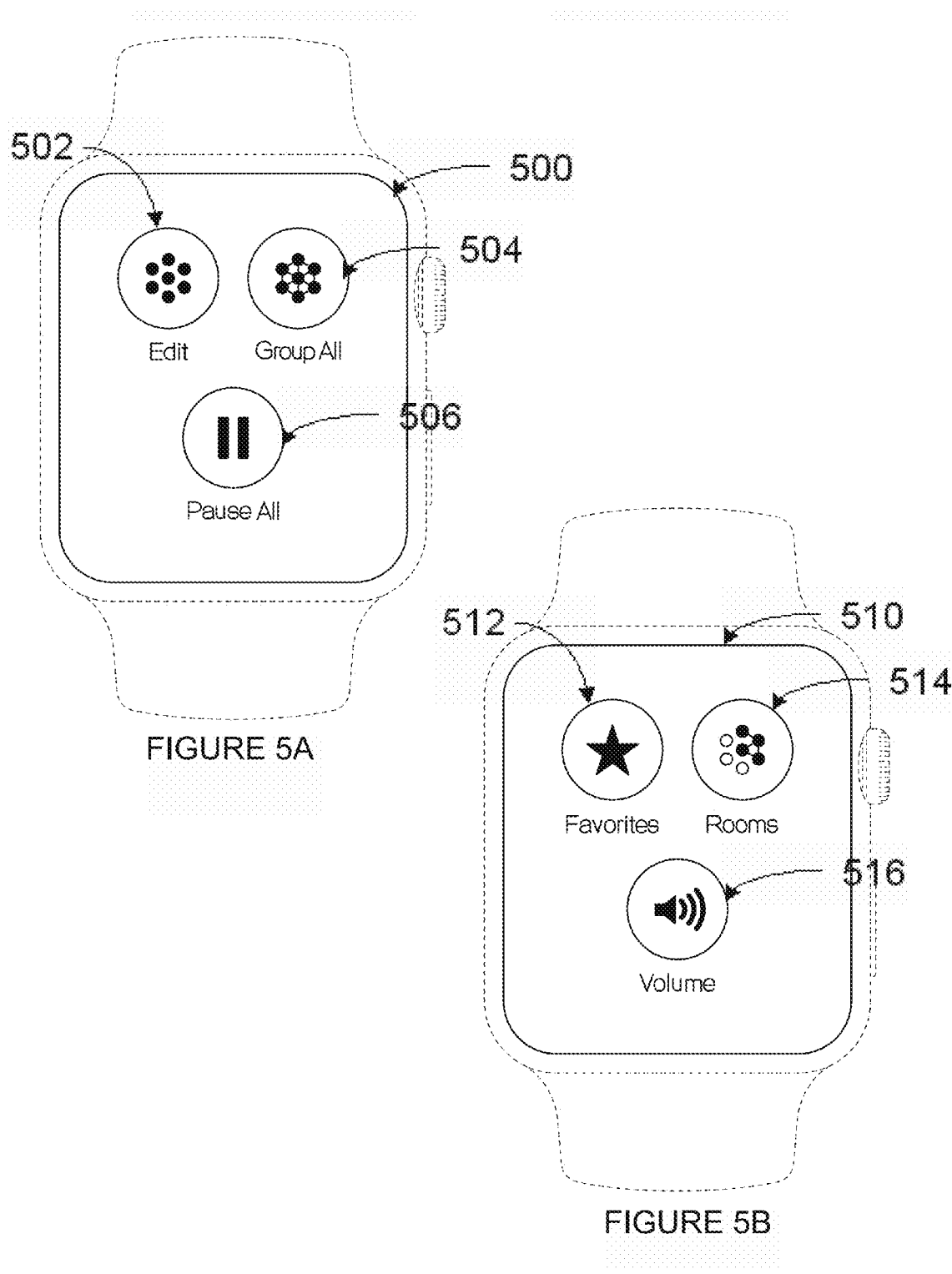
FIGS. 5A-5C illustrate example control interfaces.

FIGS. 5A and 5B show example control interfaces 500, 510 designed for an interface running on a wearable device and/or other mobile device configured to control a media playback system. In the example interface 500 of FIG. 5A, a plurality of icons represent additional interface screens, views, and/or functions such as "Edit" 502, "Group All" 504, and "Pause All" 506. Selecting one of the icons 502, 504, 506 triggers an associated function and/or interface screen to execute an action associated with the selected icon 502, 504, 506 (e.g., to edit a set of items and/or zones, to group all of a set of items and/or zones, to pause all of a set of items and/or zones, etc.).

In the example interface 510 of FIG. 5B, a plurality of icons represent additional interface screens, views, and/or functions such as "Favorites" 512, "Rooms" 514, and "Volume" 516. Selecting Favorites 512, for example, brings up an interface showing a list of favorites for a particular user, wearable device, playback device, playback system, etc. Selecting Rooms 514, for example, displays one or more rooms and/or zones available via a device running the interface 510. Selecting Volume 516, for example, facilitates adjustment of a volume or sound level associated with one or more rooms/zones accessible via the interface 510.

In certain examples, a home or default interface provides a plurality of selectable options including interfaces 500, 510. Selection of a representation associated with the interface 500, 510 transitions the display and control context to that of the respective interface 500, 510. In some examples a movement (e.g., shaking, tapping, etc.) of the device on which the interface is displayed can trigger a movement to or between interfaces 500, 510. In another example, a swipe (e.g., a horizontal movement, vertical movement, and/or other movement across a display screen showing the interface) triggers a change from interface 500 to 510 and vice versa.

In certain examples, a first controller application on a controller device is interacting with a second controller application on a wearable device. The wearable device (e.g., a smart watch, smart band, etc.) includes an organic light-emitting diode (OLED) or other semi-transparent layer for electronic content display. By default, the interface 500 or 510 is hidden or not displayed on the wearable device. The interface 500 or 510 can be activated for display on the wearable device based on: 1) manual user action (e.g., a button press, swipe, particular arm movement/gesture, etc.); 2) a change in configuration (e.g., a change in controller configuration, a change in zone group configuration, a change to/from 'party mode', other change in playback system setting, etc.); 3) an approaching playback event (e.g., an end to the user's playlist, an end to a zone's play queue, an alarm, etc.). Thus, an interaction between the wearable device, controller device, playback system, and/or trigger event determines whether the wearable device controller interface is displayed, made available for interaction, updated, etc., on a wearable device in which the default mode is one of hidden operation unless an alert is to be generated or a prompt for a next action is triggered.

Figures 5C, 6A:
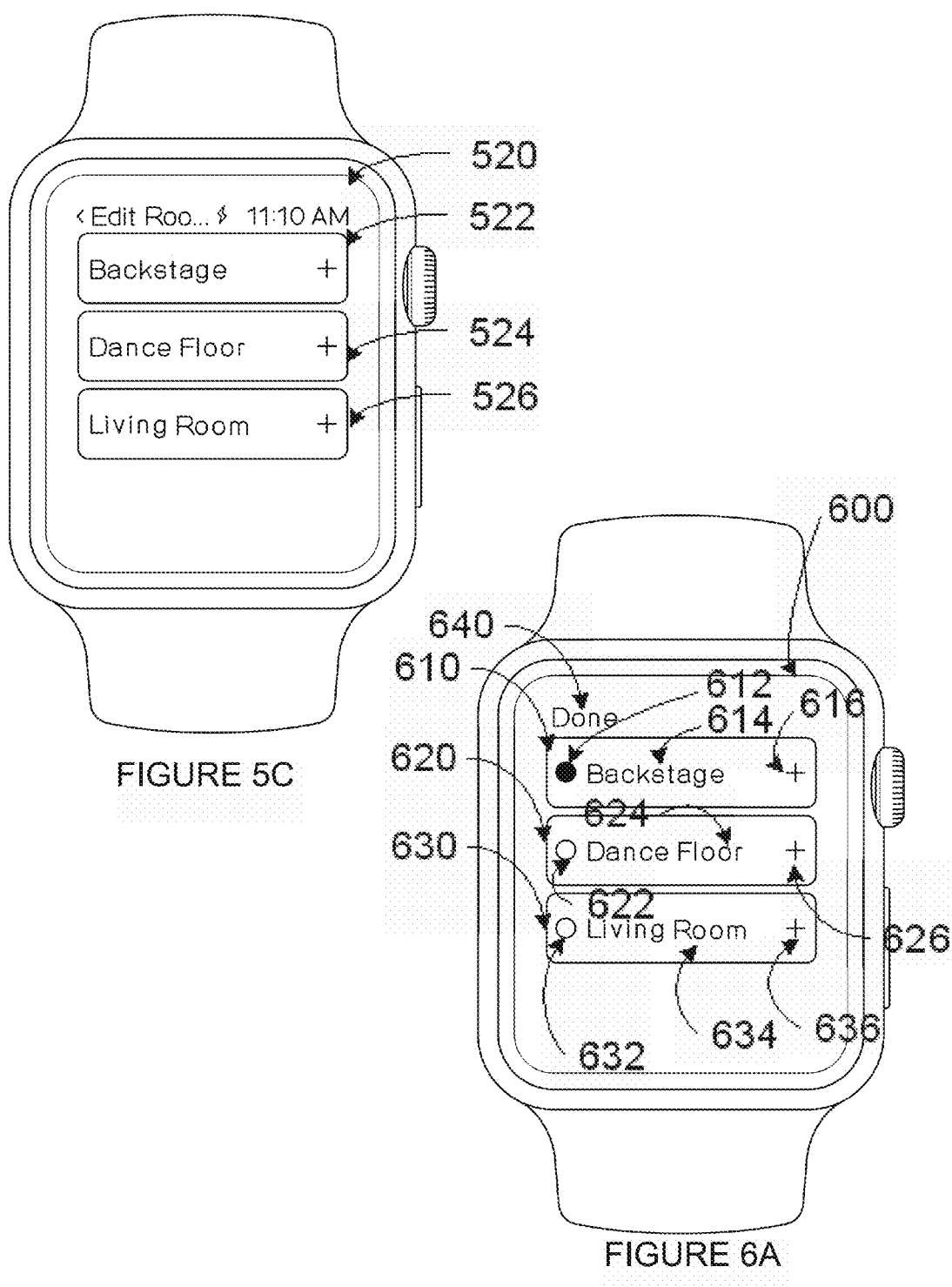
FIGS. 6A-6C illustrate example grouping control interfaces.

In certain examples, selecting an interface option such as Edit 502, Rooms 514, etc., triggers display of a room/zone edit and/or grouping interface. FIG. 5C depicts one such example interface 520. In some examples, a controller interface can display a "Now Playing" view, allowing selection of one or more multimedia content items for playback as well as volume control, etc. Within the Now Playing menu and/or as a selectable option, an "Edit" menu displays and facilitates selection of one or more zones, rooms, and/or players to control grouping of the selected zones/rooms/players. For example, when a controller interface is in a room group context or mode (such as a Now Playing menu context), an edit mode can be triggered for the group which transitions the interface to a grouping interface such as the example edit mode of FIG. 5C. After a grouping has been completed, control can transition back to the previous (e.g., Now Playing, etc.) interface mode and associated display.

In the example of FIG. 5C, the interface 520 shows three ungrouped zones that may be selected for zone grouping: "Backstage" 522, "Dance Floor" 524, and "Living Room" 526. One or more of the zones 522, 524, 526 can be selected to trigger a grouping with one or more other zones 522, 524, 526. In certain examples, a coloring, shading, pattern, and/or other graphical characteristic associated with the zone name and/or icon changes based on whether the zone is grouped with another zone, to which other zone the zone is grouped, an ungrouped status of the zone, etc.

For example, as illustrated in FIG. 5C, zones are represented in a list of selection items: Backstage 522, Dance Floor 524, and Living Room 526. Each item 522, 524, 526 can be selected to trigger a zone grouping mode to group one or more zones corresponding to items 522, 524, 526, respectively, into a new or existing zone group.

FIG. 6A shows an example interface 600 in which a representation of a "Backstage" zone 610 is selected for grouping. The example of FIG. 6A shows an initial screen for grouping zones/players/rooms starting with "Backstage"

610. Each zone 610, 620, 630 shown in the example of FIG. 6A includes a grouping indicator 612, 622, 632, a zone name 614, 624, 634, and a grouping trigger 616, 626, 636. A "Done" button or link 640 exits a group edit mode and confirms the updated group configuration, for example.

Figure 6B:
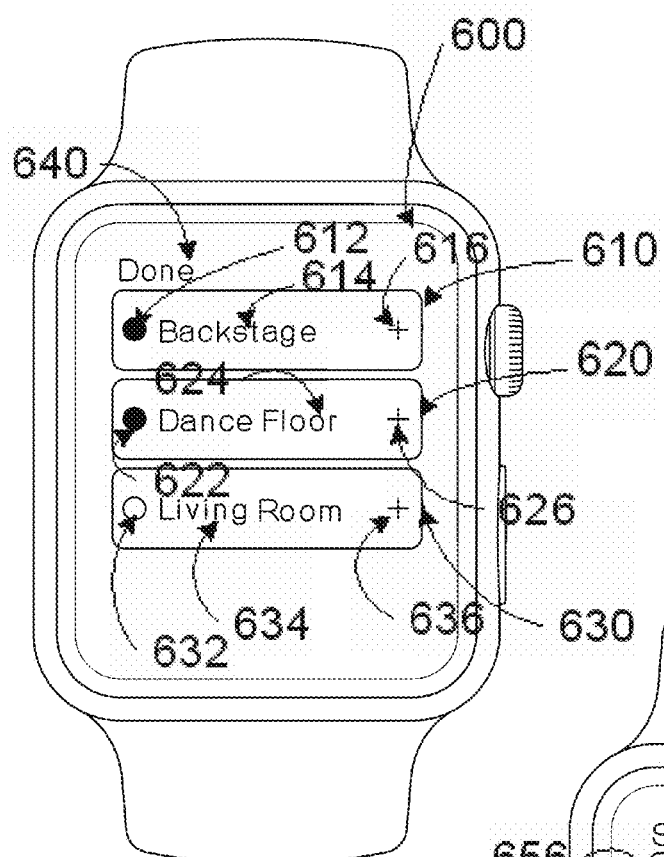

In FIG. 6A, the grouping indicator for "Backstage" 612 is depicted in a different color (e.g., shown in the example of FIG. 6A as filled in for purposes of example illustration only) than the grouping indicators for "Dance Floor" 622 and "Living Room" 632 (e.g., shown in white or clear for purposes of example illustration only). In the example of FIG. 6B, the representation of Dance Floor 620 has been selected along with the representation of Backstage 610. For example, the grouping trigger 626 for Dance Floor has been selected (e.g., clicked on, hovered over, and/or otherwise activated), and, as a result, the grouping indicator 622 for Dance Floor changes to match the grouping indicator 612 for Backstage.

Figure 6C:
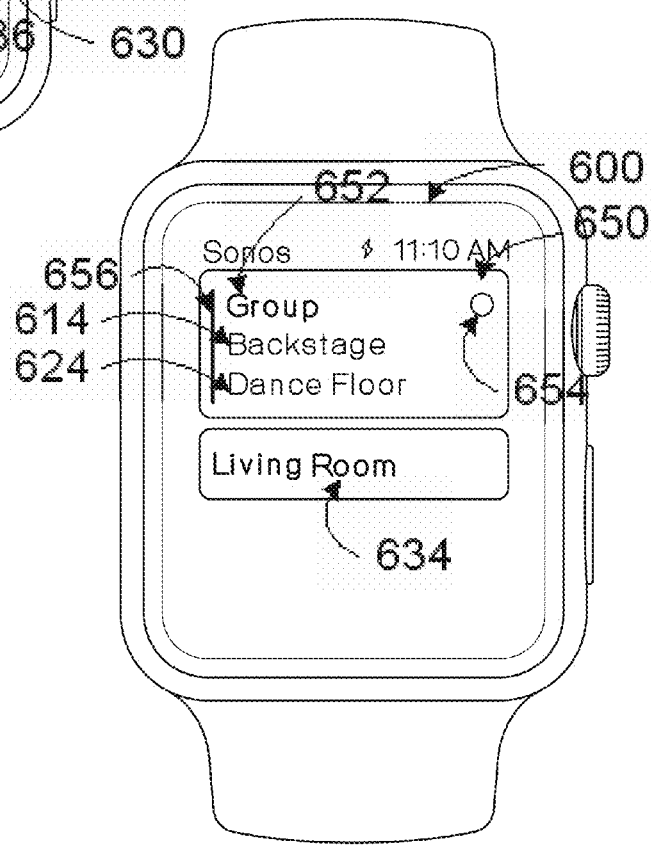

As shown in FIG. 6C, Backstage and Dance Floor are grouped. The resulting group 650 includes a group name 652, names of the group's constituent zones 614, 624, and a grouping indicator 654. Living Room 630 is represented as a separate zone because it has not been grouped with Backstage 610 and Dance Floor 620. Representations 610, 620 (and their associated zones) can be grouped upon an indication of completion (e.g., selection of "Done" 640 via the interface 600) and/or dynamically as selections are being made, for example). In some examples, a change in grouping is formalized upon acknowledgement from one or more playback devices in the affected zones. In other examples, a change in grouping is reflected dynamically without waiting for confirmation or acknowledgement. Thus, representations (e.g., names, icons, etc.) of zones, players, rooms, etc., can be selected in a grouping mode to trigger a grouping of the selected zones/players/rooms/etc. As illustrated in the example of FIG. 6C, a grouping 650 of Backstage 614 and Dance Floor 624 is displayed for control and/or other interaction. Living Room 634 is displayed individually for control and/or other interaction via the example interface 600.

Figure 7:
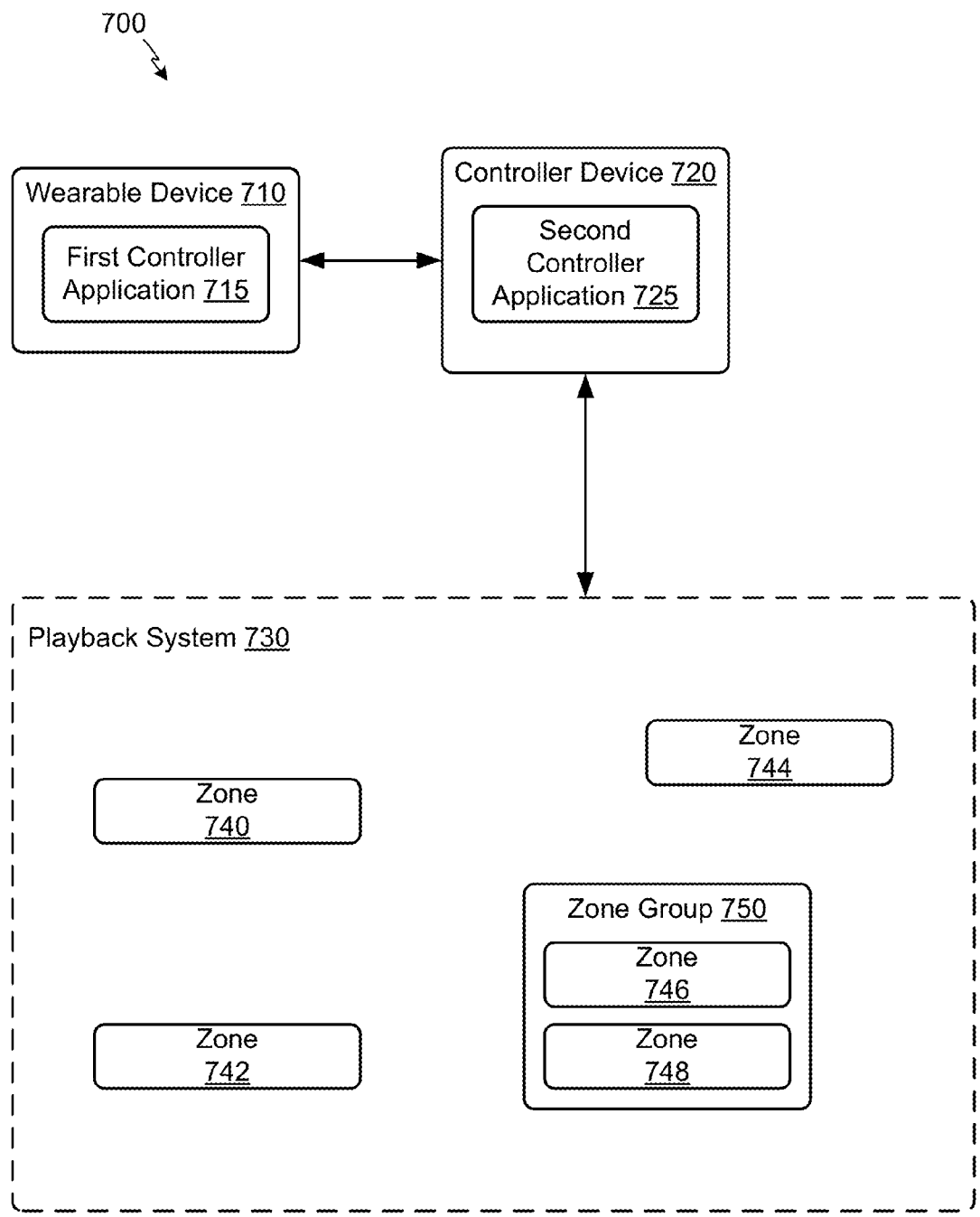
FIG. 7 shows an example control system for a media playback network.

FIG. 7 shows an example control system 700 for a media playback network. The example system 700 includes a wearable device 710 and controller device 720. The controller device 720 (e.g., a tablet computer, smart phone, laptop computer, desktop computer, television, etc.) communicates with the wearable device 710 (e.g., a smart watch, a smart band, etc.) and interfaces with a playback system 730 (e.g., a media playback system) to facilitate control (e.g., configuration, playback of content, etc.) of the playback system 730 and its constituent zones 740, 742, 744, 746, 748. As shown in the example of FIG. 7, zones can be organized into zone groups, such as zone group 750 including zones 746 and 748.

In the example system 700, the wearable device 710 includes a first controller application 715 which facilitates display of a control interface on the wearable device 710 as well as communication with the controller device to display, for example, available zones 740-748, zone group(s) 750, currently playing content, content available for playback, configuration options (e.g., group, ungroup, etc.), playback options (e.g., play, pause, volume, etc.), etc.

In the example system 700, the controller device 720 includes a second controller application 725 which communicates with the first controller application 715 of the wearable device 710 to facilitate control of the playback system 730 as well as facilitate display of information and control via the controller device 720. For example, the second controller application 725 can facilitate display, via the controller device 720, of available zones 740-748, zone group(s) 750, currently playing content, content available for playback, configuration options (e.g., group, ungroup, etc.), playback options (e.g., play, pause, volume, etc.), etc. The second controller application 725 can also relay configuration and/or other control information from the first controller application 715 to one or more components of the playback system 730 (e.g., zone grouping, ungrouping, play, pause, volume and/or other equalization setting, etc.).

In operation, the controller device 720 communicates with the wearable device 710 and one or more components of the playback system 730 to facilitate playback of media content and/or configuration of the first controller application 715, zone(s) 740-748, zone group 750, etc. The second controller application 725 on the controller device 720 interacts with the first controller application 715 on the wearable device 710 to update display of playback system 730 information and available control options and receive commands and/or other input from the first controller application 715 on the wearable device 710.

Alternatively or in addition, for example, the first controller application 715 retrieves zone 740-748 and zone group 750 configuration information via the second controller application 725 (which may obtain the information via a configuration update from the playback system 730, for example) and graphically displays the configuration information via a screen on the wearable device 710. In other examples, configuration updates can be pushed (e.g., periodically, based on an event (e.g., a change in playback system 730 configuration) and/or other trigger, etc.) to the first controller application 715 by the second controller application 725 and/or the playback system 730 without a request from the first controller application 715.

The first controller application 715 facilitates zone grouping, ungrouping, playback control, etc., based on a selection at the wearable device 710 passed to the controller device 720 to trigger a change in the playback system 730. In certain examples, the first controller application 715 displays individual zones 740, 742, 744 in a first color, shading, pattern, and/or other graphical characteristic distinct from a second color, shading, pattern, and/or other graphical characteristic used to display the zone group 750 and its member zones 746, 748. As zones 740-748 are moved in and out of the zone group 750, used to form a second zone group (not shown), etc., a coloring/shading/pattern/etc. of the representations of the zone(s) and/or zone group(s) on a user interface associated with the first controller application 715 (and also the second controller application 725) is automatically adjusted by the first controller application 715 operating in conjunction with the second controller application 725 and communicating with the playback system 730.

For example, a screen of the wearable device 710 (e.g., smart watch, smart band, etc.) shows a list of selectable items. Each item is a graphical or other visual representation of a zone 740-748 (e.g., a room, media playback device, medical playback zone, etc.). Each item can be selected via the interface on the wearable device 710 to join and/or remove the zone 740-748 corresponding to the selected item from a group of zones (e.g., zone group 750). In certain examples, a zone is shown in a "grouping color" (and/or other such shading, pattern, and/or other visual indication) that visually indicates that the first controller application 715 is in a grouping mode and any other zone that is then selected while in the grouping mode will be grouped with the given zone. Upon such a grouping, the given zone and the selected zone are shown in the same color, shade, pattern, and/or other graphical characteristic, etc. Thus, items representing zones that are already grouped together are displayed in the same color and other items apart from the group are displayed in different color(s) to visually distinguish between zones, zone groups, and/or modes of operation, for example.

In some examples, a selection area (e.g., a box, circle, oval, other border, etc.) (e.g., the box shown in FIG. 6C, etc.) shares a color with item(s) representing zones that were already a member of the zone group before the edit screen is displayed. When an item is selected, that item's color may remain unchanged until the grouping is completed (e.g., the second controller application 725 notifies the sub-controller application 715 that the playback system 730 zones have received and implemented the grouping notification, trigger, instruction, etc. (e.g., update of a grouping state table, network topology, network/grouping state variable, etc.).

In some examples, item coloration can be updated before the updated configuration is sent to the playback system 730. In other examples, a change in item coloration occurs after the configuration has been sent to the playback system 730 and a response has been received acknowledging the change (e.g., providing an updated configuration and/or other confirmation message, etc.).

In certain examples, the first controller application 715 (and second controller application 725) can include an edit, edit rooms, edit zones, etc., dialogue as part of a controller interface executing on the wearable device 710. The "edit" type dialogue can include a group or grouping dialogue that lists or otherwise shows zones/rooms/playback devices available for grouping. For example, upon selection of a given zone (which, for example, can be labeled and/or designated as a group coordinator), the "grouping" dialogue is launched with the given zone being the lead zone (e.g., presented in a different color, shade, pattern, other graphical characteristic, etc.) of the "grouping" dialogue.

Referring back to the example of FIG. 6A, the interface 600 displays a grouping dialogue driving by a first controller application 715, and the Backstage zone 610 has been selected for editing of an associated group. In the grouping dialogue, Backstage 610 is represented in a color 612 different from the other zones 622, 632. However, as illustrated in the example of FIG. 6B, as other zones (e.g., Dance Floor 620) are selected to become part of a group with Backstage 610, a corresponding color indication 622 is provided for each of those zones 620 to become part of that group. One or more zones can be selected to join a group, can be deselected to remove from a group, etc., and coloring of the zone representations will be automatically be adjusted by the first controller application 715 to reflect the change in grouping status in the grouping mode.

In an example, a first user has a smart watch running a first controller application for a Sonos™ playback network. A second user has a second controller application running on a smart phone for the same Sonos™ playback network. If the second user adds a living room zone to the backstage group, the second controller application informs the first controller application of the update. As a result of the update, a representation of the living room zone may turn a particular color, such as blue, along with the backstage representation since the zones are now grouped together.

In some examples, the wearable device 710 (e.g., a smart watch) includes a "glance" screen which provides a snapshot of the playback network 730 and/or device 710 status. For example, the glance screen provides a "quick" view of the controller application's content, such as media now playing, playback network configuration, etc. In some examples, the glance screen updates dynamically accordingly to a currently playing zone and/or zone group on the tethered second controller application 725. Selection of all or part of the glance screen can be used to open a larger, more detailed view of the controller application or portion thereof.

In certain examples, interaction with a screen and/or other surface of the wearable device 710 triggers a change in context or mode via the first controller application 715 (e.g., transitioning from a status or "at a glance" mode to an editing mode based on a swipe of the watch screen, etc.). An example wearable device 710 includes a touch screen to display a user interface associated with the first controller application 715. As illustrated in the example of FIG. 8, the first controller application 715 can include and/or work in conjunction with a user interface communicator 802, a swipe detector 804, an analyzer 806, a current context tracker 808, a context changer 810, and one or more control context definitions 812.

Figure 8:
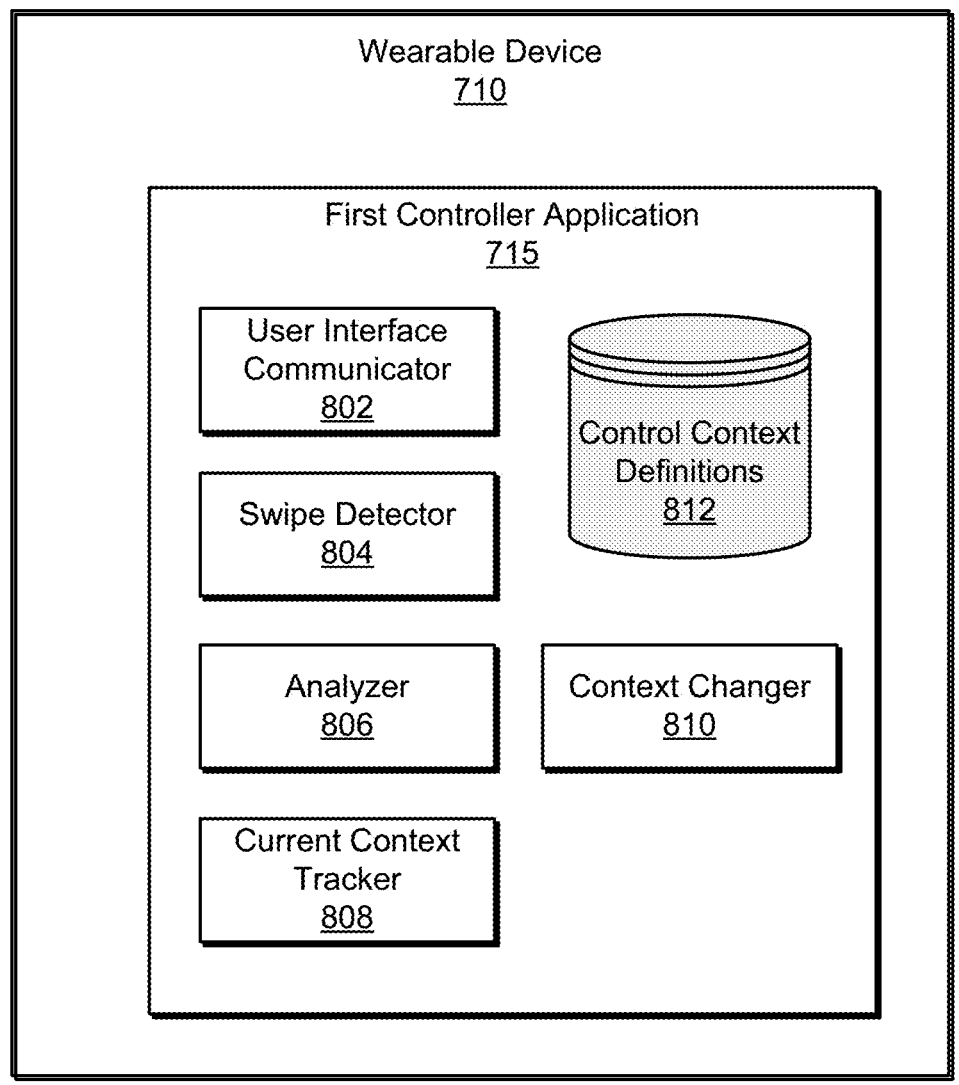
FIG. 8 illustrates an example controller application.

Generally, the example first controller application 715 of FIG. 8 enables a user of a touch screen interface to quickly and efficiently change between control contexts of the wearable device 710 and its associated controller device 720 (executing the second controller application 725). That is, the example first controller application 715 enables the user of the touch screen interface to quickly and efficiently change which mode and associated functions are provided for interaction via the wearable device 710 interface (and the associated controller device 720 interface).

Using a single touch and/or swipe of a finger and/or other skin across the touch surface of the wearable device 710, the first controller application 715 transitions among a plurality of screens, menus, modes, and/or other options such as from a time view to a now playing view to a grouping view, etc. As described above, the wearable device 710 and its first controller application 715 can transition from the example interface 500 of FIG. 5A to the example interface 510 of FIG. 5B using a touch and/or swipe motion on the touch surface of the wearable device 710. Thus, rather than navigating through multiple screens and multiple selections, a swipe, touch, and/or other skin movement alters a control context of the first controller application 715 (and associated second controller application 725). In certain examples, available control contexts (e.g., interface screens, menus, modes, and/or other options, etc.) can be cycled through in a particular order (e.g., time followed by play queue followed by editing, etc.) such as a circular list of context options. In certain examples, touch-sensitive context switching occurs in response to touch only in a certain area of the wearable device 710.

The example first controller application 715 of FIG. 8 includes a user interface communicator 802. The user interface communicator 802 interacts with or may be integrated with a user interface of the wearable device 710. The user interface communicator 802 enables the first controller application 715 to receive information regarding input via the user interface of the wearable device 710. Additionally or alternatively, the user interface communicator 802 designates a portion of a display to be presented on a user interface screen of the wearable device 710 that is to be associated with the first controller application 715. In the illustrated example, the user interface communicator 802 designates a status section (e.g., Now Playing, Playlist, Edit, Groups, Favorites, etc.) of a user interface implemented by the first controller application 715 for an input that changes the control context of the first controller application 715.

For example, the Now Playing status includes information related to a media presentation (e.g., output of an audio track) being presented in a particular zone of, for example, the system 100 of FIG. 1. That is, the Now Playing status describes (e.g., via information related to metadata) media that is playing in a zone (e.g., the living room of the system 100 of FIG. 1). A name of the current zone is displayed in the Now Playing section of the wearable device 710 interface (e.g., in a certain color). The Grouping status includes information related to available zone(s), current zone group(s), etc., as well as option(s) to adjust zone grouping(s), for example.

The user interface communicator 802 receives information related to interactions between a user and the displayed user interface and provides the received information to a swipe detector 804. The swipe detector 804 interprets information received via the user interface communicator 802 to determine whether the user has swiped the touch screen. Such an input is understood by the user to change control contexts of the first controller application 715 (and associated second controller application 725). As described above, a control context refers to a mode of the first controller application 715 indicative of which option(s), state, menu, etc., are available for interaction via the user interface. When a user wants to, for example, configure a zone group, the user performs a swiping motion on a surface of the wearable device 710 to enter the first controller application 715 into a control context associated with zone grouping/editing to configure one or more zone groups. The swipe detector 804 is capable of detecting such a swipe and in which direction (e.g., right or left) the swipe occurred.

When the swipe detector 804 determines that a swipe has occurred (e.g., based on information received via the user interface communicator 802), the swipe detector 804 informs an analyzer 806 that a swipe has occurred and provides a direction of the swipe to the analyzer 806. The example analyzer 806 determines which control context the first controller application 715 was in prior to the detected swipe by referencing a current context tracker 808. The current context tracker 808 may be a memory location that indicates which control context the first controller application 715 is in. The example current context tracker 808 includes an identifier of in which mode, menu, set of options, etc. (e.g., now playing, rooms, edit, favorites, etc.), the first controller application 715 is currently operating. However, the information defining each control context is stored in a control context definitions database 812. The example database 812 also includes an order in which the control contexts are to be displayed on the user interface of the first controller application 715. This order may be stored as a list in the database 812.

The analyzer 806 uses the information from the current context tracker 808, the direction of the swipe, and the list of the database 812 to determine in which control context the detected swipe placed the first controller application 715. For example, when the current control context is the Now Playing context that is first in the list, the swipe detector 804 detects a leftwards swipe in the Now Playing section, and the Edit Zones context is second in the list, the analyzer 806 determines that the first controller application 715 is to change from the Now Playing context to the Edit Zones context. Such a change alters the first controller application 715 (and associated second controller application 725) to control the grouping and/or ungrouping of physical devices associated with available zones (e.g., the zone player 124 of FIG. 1). As a result, selectable icons and/or other options for grouping/ungrouping are displayed (e.g., shown in one or more colorizations, patterns, representations, etc.) for configuration and control via the first controller application 715 (and associated second controller application 725), for example.

When the analyzer 806 determines that such a change in control contexts occurred, a context changer 810 changes the control context of the first controller application 715 (and/or associated second controller application 725). For example, the context changer 810 alters which context identifier is stored in the current context tracker 808. Additionally, the context changer 810 cooperates with the user interface communicator 802 to reflect the newly entered control context.

Thus, certain examples facilitate grouping, ungrouping, and/or other management of zones using reduced or "little" screen real estate available on a wearable device. Certain examples facilitate interaction between a feature-reduced controller application running on a wearable device and a more complete or "full" controller application running on a controller device, which serves as an intermediary to provide command, control, configuration, etc., to one or more components of a playback system. In certain examples, color-coding and/or other visual distinction working in combination with shifting interface screens and control modes for group edit, etc., allows a wearable device having limited available screen real estate to affect configuration and control of zones in a playback system or network.

Certain examples provide a hierarchy or family of user interfaces designed for a variety of different devices. For example, a compact or micro-interface can be provided for small, wearable devices (e.g., watch faces, bands, etc.). A standard interface can be provided for other controller devices such as smart phones and tablets. A larger interface can be provided for desktop and laptop computers. A macro interface can be provided for televisions, projection screens, etc. Some or all elements of the control interfaces disclosed and described herein can be applied to other interfaces beyond the micro interface, although many of the described features are particularly beneficial in solving problems presented by the limited display area available for a micro interface on a wearable device.

Figure 9:
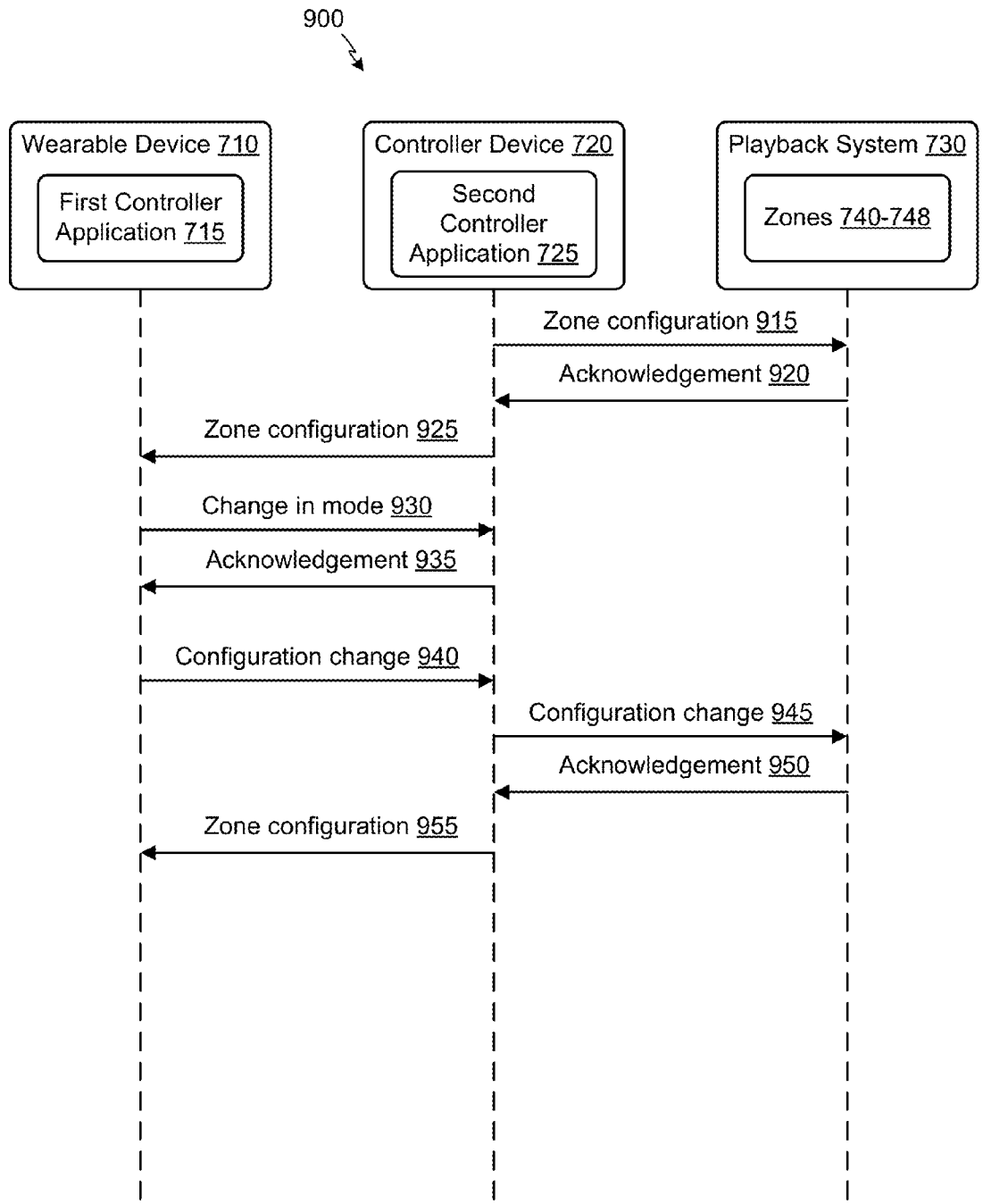
FIG. 9 illustrates an example data flow diagram depicting a flow of data between the wearable device, controller device, and playback system.

FIG. 9 illustrates an example data flow diagram 900 depicting a flow of data between the wearable device 710 (and its associated first controller application 715), controller device 720 (and its associated second controller application 725), and playback system 730 (and associated zones 740-748). As shown in the example of FIG. 9, a zone configuration 915 is transmitted from the second controller application 725 to the zones 740-748 of the playback system 730. The zone configuration 915 can include zone names, zone grouping identification, zone and/or zone group representation parameter(s) (e.g., color, pattern, etc.), currently playing content, other state variable(s), etc. One or more zones 740-748 provide an acknowledgement 920 back to the controller device 720.

The second controller application 725 then passes the zone configuration 925 on to the first controller application 715 running on the wearable device 710. The wearable device 710 and its first controller application 715 update an associated graphical user interface using on the zone configuration 925.

Based on interaction with the first controller application 715 on the wearable device 710, a change in mode 930 is triggered (e.g., based on user selection, swipe, etc., via the user interface associated with the first controller application 715 on the wearable device 710) and provided by the first controller application and wearable device 710 to the second controller application 725 running on the controller device 720, which provides an acknowledgement 935 back to the first controller application 715 on the wearable device 710. For example, a change from a 'Now Playing' mode to an 'Edit Zones' mode is triggered on the wearable device 710 and notification of the change in mode/context is sent to the second controller application 725 on the controller device 720.

With the wearable device 710 in its changed mode (e.g., in an Edit Zones mode), a change in zone configuration is facilitated via the first controller application 715. For example, the user can manipulate a zone grouping via the graphical user interface associated with the first controller application 715 on the wearable device 710. As a result of the input obtained via the wearable device 710 (e.g., the watch), the wearable device 710 provides the configuration change 940 (e.g., updated zone grouping information, associated change in zone representation (e.g., color, pattern, shading, etc., of zones in a group) on the interface corresponding to grouping, etc.) to the second controller application 725 running on the controller device 720. The second controller application 725 on the controller device 720 relays the configuration change 945 to one or more devices (e.g., one or more zones 740-748) in the playback system 730. One or more zones 740-748 receiving the change in zone configuration 945 from the first controller application 715 via the second controller application 725 can adjust one or more configuration parameters, zone relationship(s), state table, network topology, zone group variable(s), etc., to reflect the updated configuration.

Thus, in certain examples, a third device (e.g., the wearable device 710) acts as a control device for the playback system 730 but does not communicate directly with a playback device or zone 740-748 in the playback system 730. Instead, the first controller application 715 running on the wearable device 710 relies on a second controller application 725 running on a controller device 720 to communicate with playback devices on the playback network 730. While the second controller application 725 may be able to accept control inputs via a graphical user interface running on the controller device 720, in such a configuration the second controller application 725 receives control inputs from the tethered wearable device 710 and its first controller application 715. In some examples, a cover or "glance" screen displayed by the first controller application 715 on the wearable device 710 updates dynamically according to a currently playing zone and/or zone group on the tethered second controller application 725.

In certain examples, the wearable device 710 is paired with or tethered to the controller device 720 through an exchange of messages between the first controller application 715 and the second controller application 725. The first and second controller applications 715, 725 exchange messages (e.g., automatically and/or on command) to identify themselves and establish a relationship between the applications 715, 725 for exchange of commands, status, and configuration information, for example. In some examples, multiple wearable devices 710 can be paired with a single controller device 720. Alternatively or in addition, multiple controller devices 720 can be paired with a single wearable device 710. In some such examples in which multiple devices are paired with or tethered to a single device, one device may be designated as a master and/or message timing can be considered to avoid multiple devices relaying the same message to another device and/or to the playback system 730. State variables (and changes therein) can also be used to avoid unintentional errors resulting from duplicate commands, for example.

For example, when the first controller application 715 is launched on the wearable device 710, the first controller application 715 retrieves state variable(s) for the playback system 730 (e.g., via the second controller application 725) and displays information based on the retrieved state variable(s). When an instruction for a change in configuration is sent from the first controller application 715 on the wearable device 710, the wearable device 710 sends a message to the controller device 720 when then sends a message to the playback system 730 to make the change. The playback system 730 confirms or otherwise acknowledges the change in a message or change in state variable to the controller device 720, which can cause the wearable device 710 to update, for example.

Figure 10:
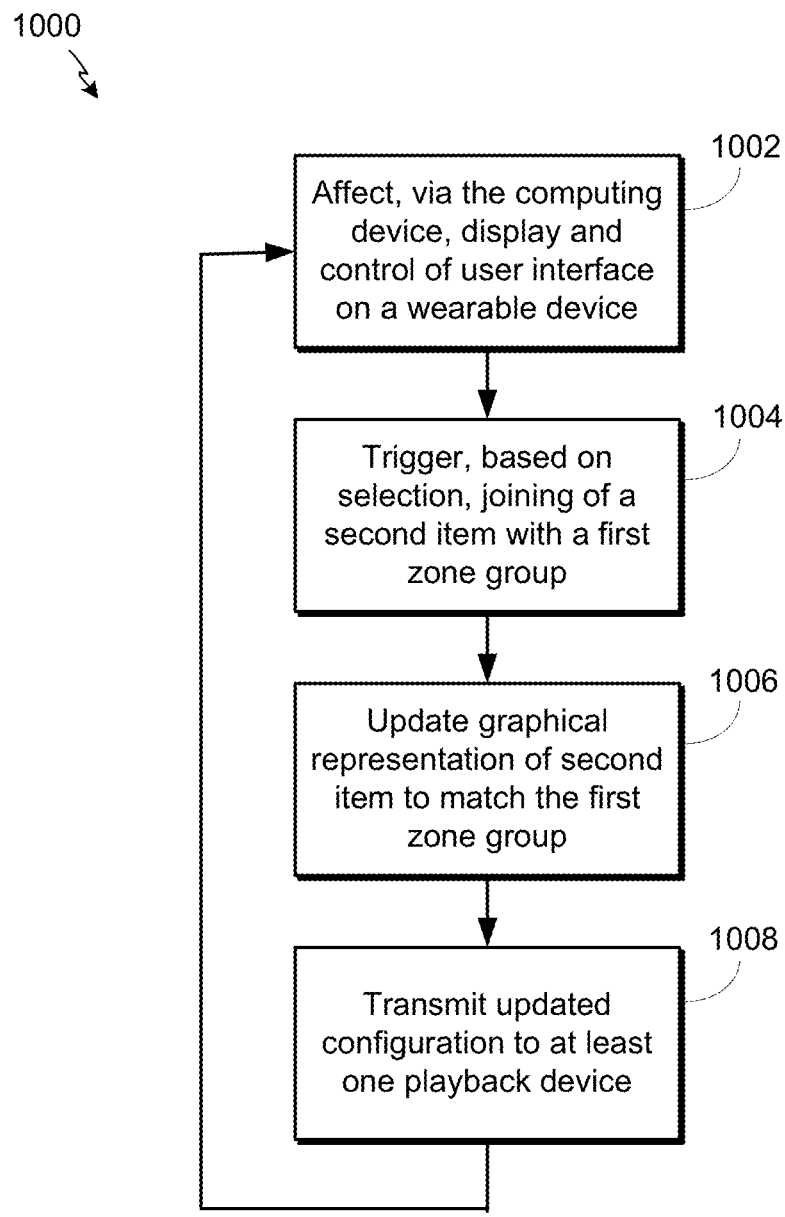
FIGS. 10-13 show flow diagrams that illustrate example methods to facilitate zone grouping and control in a playback system.

FIG. 10 shows a flow diagram that illustrates an example method 1000 to facilitate zone grouping and control in a playback system (e.g., playback system 730). In certain examples, a computing device (e.g., controller device 720) and a processor execute the example method 1000. The computing device includes a communication interface configured to exchange data and commands between the computing device and a wearable device (e.g., wearable device 710) to control the playback system. The processor is configured to receive and process input in conjunction with the communication interface to facilitate control of the playback system at least by executing the example method 1000.

At block 1002, display and control of a user interface configured for a display of the wearable device are affected by the computing device. For example, the user interface forms a control interface to affect a configuration of playback devices in the playback system, and each playback device in the playback system is associated with at least one zone. In the example of FIG. 10, the control interface is arranged to display at least a first selectable item and a second selectable item, each item corresponding to a zone and selectable to cause the corresponding zone to be one of added to or removed from a zone group. The example zone group forms part of the configuration of the playback devices in the playback system. For example, a Backstage label and a Dance Floor label are displayed as the first and second selectable items via the user interface on a smart watch.

At block 1004, based on a selection of the second item via the user interface, a joining of a second zone corresponding to the second item with a selected first zone group is triggered. The first zone group includes a first zone represented by the first item, for example. In the example of FIG. 10, the first item is displayed in a first color and the second item representing the second zone is displayed in a second color. For example, selection of the Dance Floor label triggers a grouping of the Dance Floor zone with the Backstage zone. In certain examples, prior to the selection of the second item, a plurality of mode options are displayed, and a selection of an edit mode is received from the plurality of mode options.

At block 1006, a graphical representation of the second item is updated, based on the joining of the second zone to the first zone group, to display the second item in the first color. For example, the Backstage label associated with the Backstage zone is displayed in the first color, and the Dance Floor label associated with the Dance Floor zone is initially displayed in the second color but is changed to display in the first color once the Dance Floor zone is grouped with the Backstage zone.

At block 1008, an updated configuration is transmitted to at least one playback device in the playback system. The updated configuration is based on the joining of the second zone to the first zone group, for example. For example, the updated configuration including the Dance Floor zone grouped with the Backstage zone is transmitted by the computing device to one or more zones in the playback system.

Figure 11:
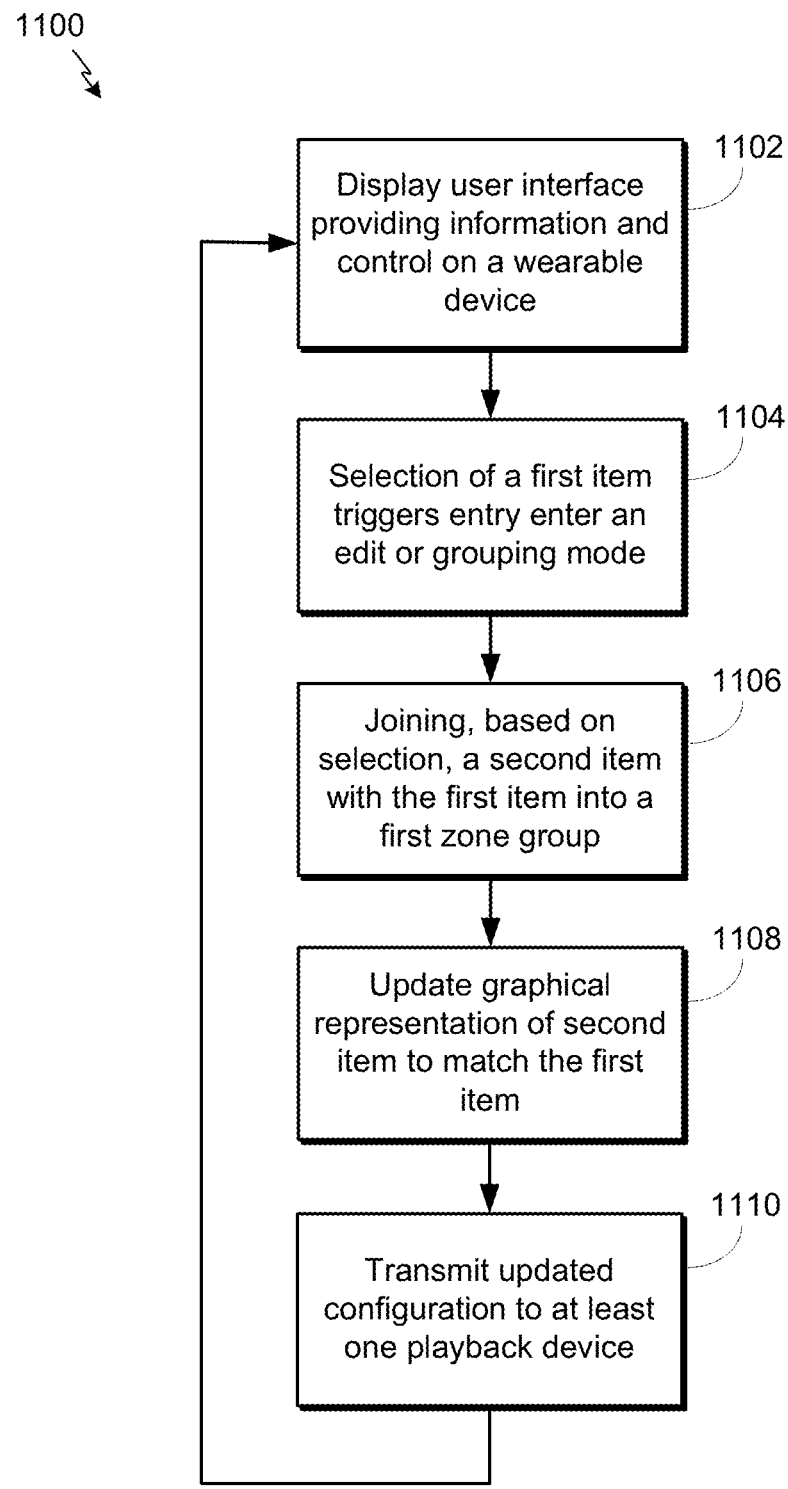

FIG. 11 shows a flow diagram that illustrates an example method 1100 to facilitate zone grouping and control in a playback system (e.g., playback system 730). In certain examples, a wearable device (e.g., wearable device 710 executing the first controller application 715) communicates with a computing device (e.g., the controller 720) to exchange data and commands between the wearable device and the computing device to control the playback system and execute the example method 1100.

At block 1102, a user interface providing information and control via a display screen of the wearable device is displayed. The example user interface forms a control interface to affect a configuration of playback devices in the playback system, and each playback device in the playback system is associated with at least one zone. In the example of FIG. 11, the control interface is arranged to display at least a first selectable item and a second selectable item, each item corresponding to a zone and selectable to cause the corresponding zone to be one of added to or removed from a zone group. The example zone group forms part of the configuration of the playback devices in the playback system. For example, a Backstage label and a Dance Floor label are displayed as the first and second selectable items via the user interface on a smart watch.

At block 1104, selection of the first item triggers entry into a zone grouping mode. In certain examples, a plurality of mode options are displayed, and a selection of an edit mode is received from the plurality of mode options. For example, selecting the Backstage label triggers the wearable device to operate in a zone grouping or edit mode rather than a now playing mode.

At block 1106, based on a selection of the second item via the user interface, a second zone corresponding to the second item is joined with the selected first item into a first zone group. The first zone group includes a first zone represented by the first item, for example. In the example of FIG. 11, the first item is displayed in a first color and the second item representing the second zone is displayed in a second color. For example, selection of the Dance Floor label triggers a grouping of the Dance Floor zone with the Backstage zone.

At block 1108, a graphical representation of the second item is updated, based on the joining of the second zone to the first zone group, to display the second item in the first color. For example, the Backstage label associated with the Backstage zone is displayed in the first color, and the Dance Floor label associated with the Dance Floor zone is initially displayed in the second color but is changed to display in the first color once the Dance Floor zone is grouped with the Backstage zone.

At block 1110, an updated configuration is transmitted to at least one playback device in the playback system. The updated configuration is based on the joining of the second zone to the first zone group, for example. For example, the updated configuration including the Dance Floor zone grouped with the Backstage zone is transmitted by the computing device to one or more zones in the playback system. In certain examples, the computing device (e.g., the controller) relays the updated configuration from the wearable device to a plurality of playback devices corresponding to the plurality of zones in the playback system.

In certain examples, the order of blocks in the FIG. 11 can vary from the example order depicted. For example, the update of the graphical representation of the second item at block 1108 to match the first item after the updated configuration has been transmitted to at least one playback device at block 1110. In such examples, after an acknowledgement has been received from the playback device regarding the updated configuration (or the playback device has sent an updated configuration in response to a change instruction from the controller), then the graphical representation of the second item is changed to match the graphical representation of the first time (block 1108).

Figure 12:
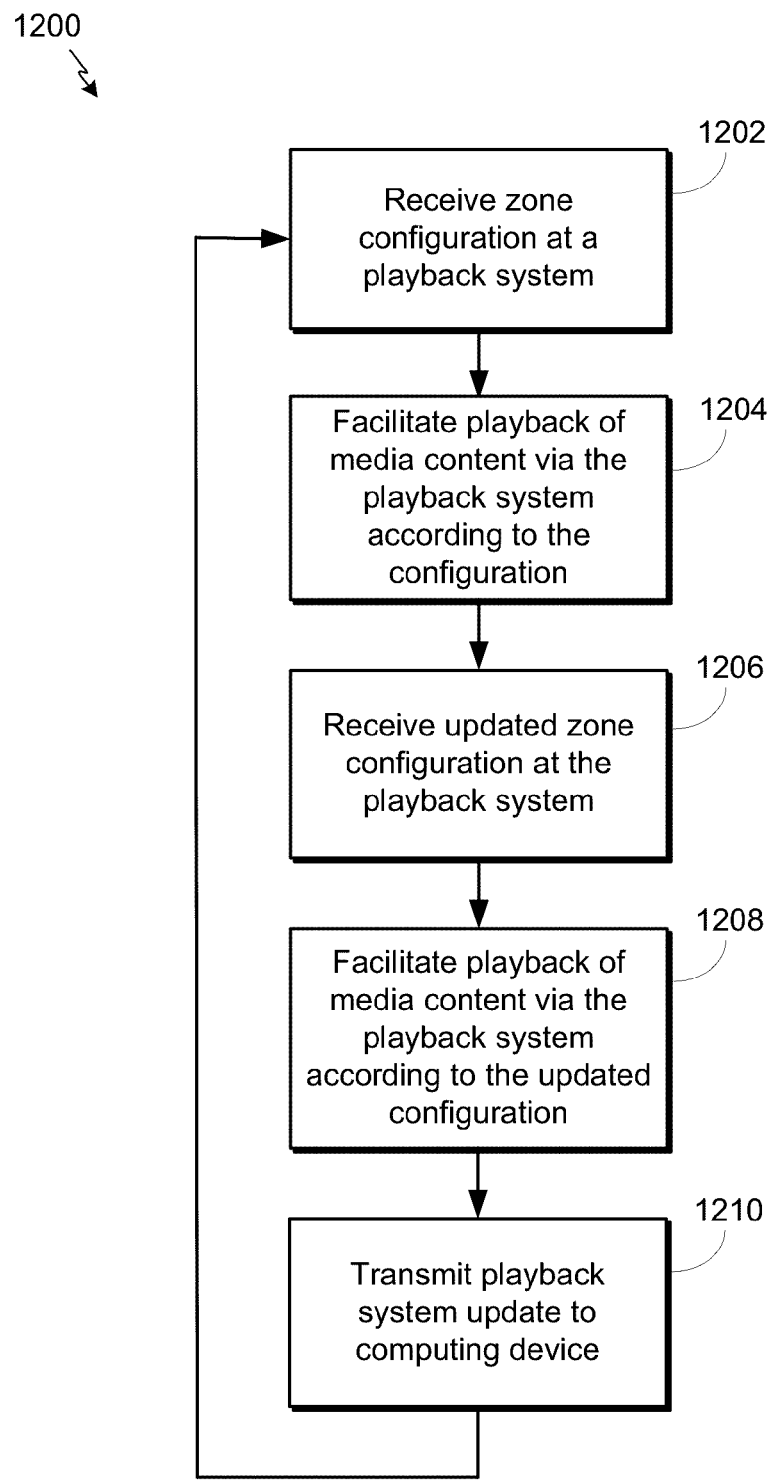

FIG. 12 shows a flow diagram that illustrates an example method 1200 to facilitate zone grouping and control in a playback system (e.g., playback system 730). In certain examples, the playback system receives an updated configuration from a computing device (e.g., controller 720), which communicates with a wearable device (e.g., wearable device 710) to control the playback system and execute the example method 1200.

At block 1204, a zone configuration for zones in the playback system is received by one or more zones in the playback system. The configuration can identify zones in the playback system and specify one or more groupings of those zones to play certain content in synchrony among the playback devices in the zone group, perhaps based on a certain trigger (e.g., time, selection, event, etc.). One or more zones (e.g., all zones, a designated "primary" or "master" zone, a zone group coordinator, etc.) can store the zone configuration to facilitate operation of the playback system, for example.

At block 1204, playback of media content via the playback system is facilitated according to the zone configuration. For example, playback of audio content (e.g., stored audio files, streaming audio, multimedia files, etc.) is facilitated via the playback system according to the zones (and associated playback devices) and zone groupings specified in the zone configuration (e.g., topology, state variable, configuration table, etc.).

At block 1206, an updated zone configuration is received by one or more zones in the playback system. For example, selection of zones to form a zone group via the computing device and/or the wearable device results in a change in a zone grouping and, as a result, an update or change in the zone configuration for the playback system. The computing device can then send the updated zone configuration to the playback system so that one or more zones in the playback system stored the updated configuration and operate in accordance with the updated zone configuration information (e.g., new zone grouping, etc.).

At block 1208, playback of content via the playback system is facilitated according to the updated zone configuration. At block 1210, an update to the playback system can be transmitted back to the computing device. For example, addition or removal of a playback device to the playback system results in a configuration change that is communicated to the computing device. The computing device can propagate the change to the user interface displayed on the wearable device. Further action via a controller interface can result in further adjustment to zone grouping and/or other playback system configuration parameter(s) and/or other setting(s), for example.

Figure 13:
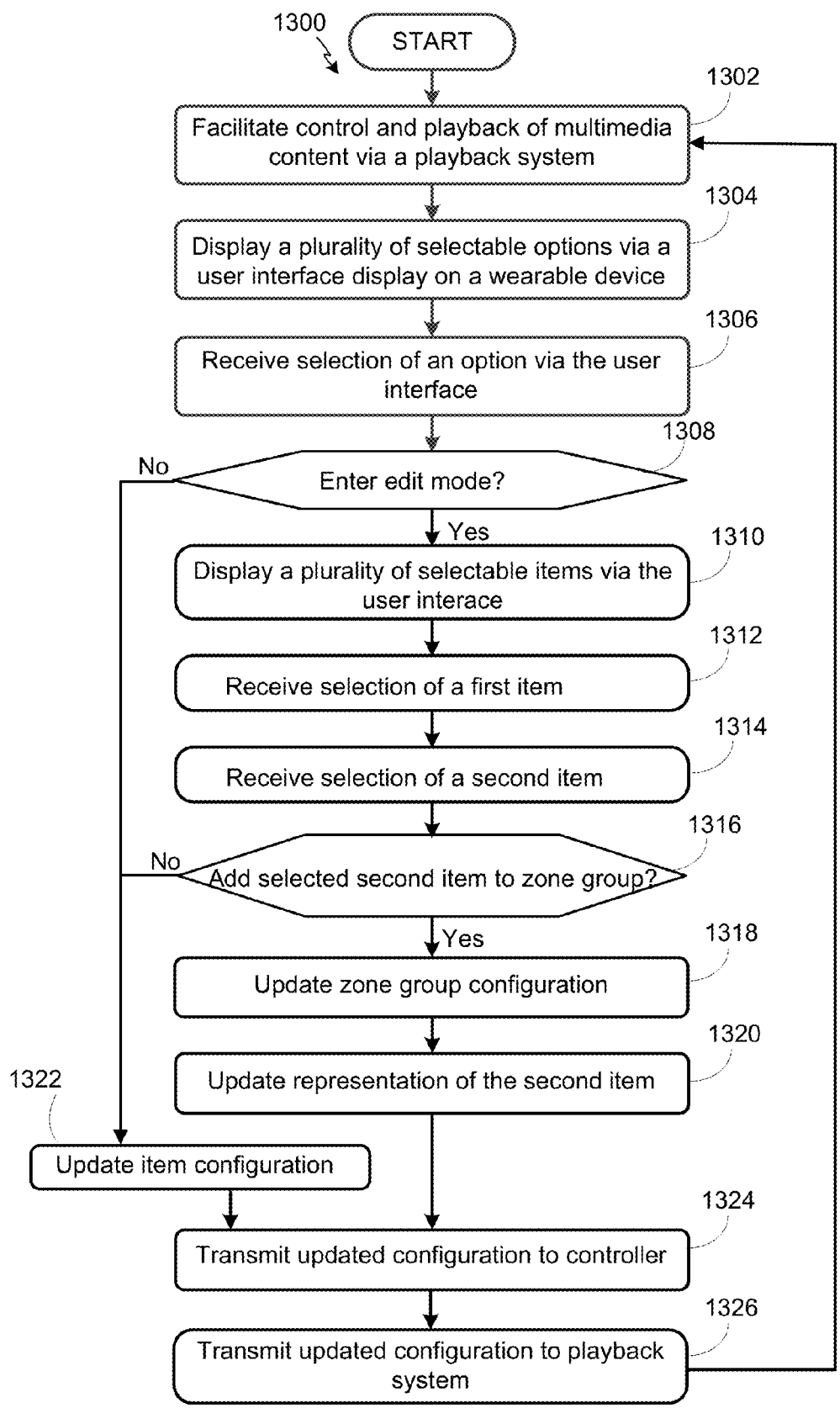

FIG. 13 shows a flow diagram that illustrates an example method 1300 to facilitate zone grouping and control in a playback system (e.g., playback system 730). In certain examples, a wearable device (e.g., wearable device 710 executing the first controller application 715) communicates with a computing device (e.g., the controller 720) to exchange data and commands between the wearable device and the computing device to control the playback system and execute the example method 1300.

At block 1302, control and playback of multimedia content are facilitated via the playback system. For example, the computing device and/or wearable device, working individually and/or together, provide configuration information (e.g., a zone configuration, etc.), playback instructions, content, and/or other control to affect operation and other behavior of one or more playback devices forming one or more zones and/or zone groups in the playback system.

At block 1304, a plurality of selectable options are displayed via a user interface display on the wearable device. For example, a first controller application 715 running on the wearable device 710 and driven by the second controller application 725 running on the controller device 720 generates a user interface display, shown on the wearable device 710, which represents a plurality of options (e.g., play, rooms, edit, favorites, etc.) based on name, icon, location, hierarchy, etc.

At block 1306, selection of an option displayed via the user interface is received. For example, selection of an option is received at the computing device (e.g., the controller 720) and/or received by the wearable device (e.g., wearable device 710) and relayed from the wearable device to the computing device.

At block 1308, based on the selection, entry into an edit mode is determined. For example, if the selected option is an edit option (e.g., edit rooms, edit zones, edit groups, edit, etc.), then an editing mode is triggered (e.g., a zone/zone group edit mode, etc.). In the edit mode, the grouping and/or other arrangement of zones can be edited for the playback system.

At block 1310, a plurality of selected items are displayed via the user interface. For example, a first controller application 715 running on the wearable device 710 and driven by the second controller application 725 running on the controller device 720 generates the user interface display, shown on the wearable device 710, which represents a plurality of zones/zone group(s) for the playback system as selectable items based on name, icon, location, hierarchy, etc.

At block 1312, selection of a first item displayed via the user interface is received. For example, selection of a first item is received at the computing device (e.g., the controller 720) and/or received by the wearable device (e.g., wearable device 710) and relayed from the wearable device to the computing device. The selection of the first item (e.g., a first item displayed in a first color and/or pattern, etc.,) triggers a zone grouping mode for a first zone associated with the first item. In the zone grouping mode, the computing device and/or wearable device awaits a second item to group with the first item to form and/or add to a zone group (e.g., form a new zone group is not currently in a zone group and add to a first zone group if the first zone is currently a member of the first zone group, etc.).

At block 1314, selection of a second item displayed via the user interface is received. For example, selection of a second item is received at the computing device (e.g., the controller 720) and/or received by the wearable device (e.g., wearable device 710) and relayed from the wearable device to the computing device.

At block 1316, the selection of the second item is evaluated to determine whether the second item (e.g., displayed in a second color and/or pattern, etc.) is to be added to a zone group. If so, then at block 1318, a zone group configuration is updated to reflect the addition of the second zone associated with the second item to the zone group, and at block 1320, a representation of the second item is updated based on the zone grouping. For example, the second zone is grouped with the first zone to form a first zone group, and, at block 1320, a representation of the second item is transformed or otherwise updated to be shown in the same first color, pattern, etc., as the first item. As another example, the second zone is grouped into an existing first zone group with the first zone (and potentially other zones as well), and, at block 1320, the representation of the second item is transformed or otherwise updated to be shown in the same first color, pattern, etc., as the first item.

Alternatively, the selected second item can correspond to a second zone that is already in the first zone group with the first zone. The selected second item can be removed from the first zone group, resulting in an updated zone configuration and a change in the representation of the second item to be a second color/pattern/etc. different from that of the first zone, for example.

At block 1322, if the system isn't in an edit mode and/or the selected second item is not to be added to a zone group, then configuration of the selected item/option can otherwise be updated based on input, parameters, environment, currently playing content, etc. For example, selection of an item or other option can result in a change in volume for playback, play/pause playback of media content, selection of new media content for playback, designation of content as a "favorite", selection of a room/zone, and/or other control of playback system operation and/or configuration.

At block 1324, the updated configuration is transmitted to the controller. For example, the updated configuration can be transmitted to the controller by a controller application running on the controller. Alternatively or in addition, the updated configuration can be transmitted from the wearable device to the controller. At block 1326, the updated configuration is transmitted from the controller to the playback system. For example, the controller device transmits the updated configuration to one or more playback devices (e.g., zones) in the playback network so that the devices can process the updated configuration and configure themselves for communication, playback, and/or other settings according to the new zone group configuration.

Although the blocks of methods 1000-1300 are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods 1000-1300 and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the methods 1000-1300 and other processes and methods disclosed herein, each block in FIGS. 10-13 may represent circuitry that is wired to perform the specific logical functions in the process.

Thus, for example, in operation, a playback device outputs content according to one or more playback settings. Operation for playback and/or other configuration of the playback device occurs and/or is adjusted in response to a determination of zone grouping and/or other modification via a controller device and associated wearable device.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The example embodiments described herein provide systems and methods to facilitate zone grouping and adjustment of zone representation dependent upon a zone's grouping status. Certain embodiments enable and/or facilitate interaction between a wearable or mobile device having a first controller application, a controller device having a second controller application, and a playback system including one or more playback devices organized according to one or more zones that may or may not be grouped into one or more zone groups. By representing grouped zones in the same way (e.g., same color, same pattern, etc.), a grouped relationship and confirmation of successful grouping, etc., can be readily and easily enabled and verified.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware. It may be noted that operations performed by the computing device and/or other components disclosed and described herein (e.g., operations corresponding to process flows or methods discussed herein, or aspects thereof) may be sufficiently complex that the operations may not be performed by a human being within a reasonable time period.

We claim:

1. A computing device comprising:
    a communication interface configured to exchange data and commands between the computing device and a wearable device to control of a playback system; and
    a processor configured to receive and process input in conjunction with the communication interface to facilitate control of the playback system, the processor configured to:
    affect display and control of a user interface configured for a display of the wearable device, the user interface forming a control interface to affect a configuration of playback devices in the playback system, each playback device in the playback system associated with at least one zone, the control interface arranged to display at least a first item and a second item, wherein the first item is displayed using a first graphical characteristic and the second item is displayed using a second graphical characteristic, each item corresponding to a zone and selectable to cause the corresponding zone to be added to a zone group, the configuration of the playback devices in the playback system including the zone group;
    trigger, based on a selection of the second item via the user interface, a joining of a second zone corresponding to the second item with a first zone group including a first zone represented by the first item; and
    transmit an updated configuration to at least one playback device in the playback system, the updated configuration based on the joining of the second zone to the first zone group.

2. The system of claim 1, wherein the first zone group includes the first zone and a third zone displayed using the first graphical characteristic.

3. The system of claim 1, wherein the wearable device comprises a watch.

4. The system of claim 3, wherein the computing device comprises a controller application running on at least one of a smart phone and a tablet computer.

5. The system of claim 1, further comprising, prior to the selection of the second item, displaying a plurality of mode options and receiving a selection of an edit mode from the plurality of mode options.

6. The system of claim 1, wherein the controller relays the updated configuration from the wearable device to a plurality of playback devices corresponding to the plurality of zones in the playback system.

7. The system of claim 1, wherein the graphical representations of the zones include at least an alphanumeric zone name displayed according to a corresponding color associated with the respective zone.

8. The system of claim 1, wherein the first graphical characteristic comprises at least one of a first color, a first shading, or a first pattern, and wherein the second graphical characteristic comprises at least one of a second color, a second shading, or a second pattern.

9. The system of claim 1, wherein the processor is configured to cause the wearable device to update the graphical representation of the second item based on the joining of the second zone to the first zone group, to display the second item using the first graphical characteristic.

10. A non-transitory computer readable storage medium including instructions which, when executed by a computing device, cause the computing device to implement a method, the method comprising:
- affecting, via the computing device, display and control of a user interface configured for a display of a wearable device, the user interface forming a control interface to affect a configuration of playback devices in a playback system, each playback device in the playback system associated with at least one zone, the control interface arranged to display at least a first item and a second item, wherein the first item is displayed using a first graphical characteristic and the second item is displayed using a second graphical characteristic, each item corresponding to a zone and selectable to cause the corresponding zone to be added to a zone group, the configuration of the playback devices in the playback system including the zone group;
- triggering, via the computing device based on a selection of the second item via the user interface, a joining of a second zone corresponding to the second item with a first zone group including a first zone represented by the first item;
- and transmitting, via the computing device, an updated configuration to at least one playback device in the playback system, the updated configuration based on the joining of the second zone to the first zone group.

11. The non-transitory computer readable storage medium of claim 10, wherein the first zone group includes the first zone and a third zone displayed using the first graphical characteristic.

12. The non-transitory computer readable storage medium of claim 10, wherein the wearable device comprises a watch.

13. The non-transitory computer readable storage medium of claim 12, wherein the computing device comprises a controller application running on at least one of a smart phone and a tablet computer.

14. The non-transitory computer readable storage medium of claim 10, wherein the instructions cause the computing device to cause the wearable device to update the graphical representation of the second item based on the joining of the second zone to the first zone group, to display the second item using the first graphical characteristic.

15. A method comprising:
- affecting, via a computing device, display and control of a user interface configured for a display of a wearable device, the user interface forming a control interface to affect a configuration of playback devices in a playback system, each playback device in the playback system associated with at least one zone, the control interface arranged to display at least a first item and a second item, wherein the first item is displayed using a first graphical characteristic and the second item is displayed using a second graphical characteristic, each item corresponding to a zone and selectable to cause the corresponding zone to be added to a zone group, the configuration of the playback devices in the playback system including the zone group;
- triggering, via the computing device based on a selection of the second item via the user interface, a joining of a second zone corresponding to the second item with a first zone group including a first zone represented by the first item;
- and
- transmitting, via the computing device, an updated configuration to at least one playback device in the playback system, the updated configuration based on the joining of the second zone to the first zone group.

16. The method of claim 15, wherein the first zone group includes the first zone and a third zone displayed using the first graphical characteristic.

17. The method of claim 15, wherein the wearable device comprises a watch, and wherein the computing device comprises a controller application running on at least one of a smart phone and a tablet computer.

18. The method of claim 15, wherein the controller relays the updated configuration from the wearable device to a plurality of playback devices corresponding to the plurality of zones in the playback system.

19. The method of claim 15, wherein the first graphical characteristic comprises at least one of a first color, a first shading, or a first pattern and wherein the second graphical characteristic comprises at least one of a second color, a second shading, or a second pattern.

20. The method of claim 15, further comprising causing the wearable device to update the graphical representation of the second item based on the joining of the second zone to the first zone group, to display the second item using the first graphical characteristic.

* * * * *